United States Patent
Rubel

[11] Patent Number: 5,980,001
[45] Date of Patent: Nov. 9, 1999

[54] GROUND PENETRATING TRACTION STUD

[76] Inventor: Edward R Rubel, 68 Landing Rd. S., Rochester, N.Y. 14610

[21] Appl. No.: 08/813,861

[22] Filed: Mar. 7, 1997

[51] Int. Cl.$^6$ .................................................. B62D 55/26
[52] U.S. Cl. ........................................... 305/180; 305/162
[58] Field of Search ..................................... 305/160, 161, 305/162, 165, 180, 181, 191; 301/43; 404/121

[56] References Cited

U.S. PATENT DOCUMENTS

| | | |
|---|---|---|
| 575,662 | 1/1997 | Andresen . |
| 885,205 | 4/1908 | Ulrich . |
| 1,856,320 | 5/1932 | Curtis . |
| 2,061,962 | 11/1936 | Gabriele . |
| 2,096,041 | 10/1937 | Hosking . |
| 2,426,974 | 9/1947 | Ragon . |
| 2,714,768 | 8/1955 | Badler . |
| 3,014,547 | 12/1961 | Van Der Lely . |
| 3,180,442 | 4/1965 | Pomeroy . |
| 3,572,851 | 3/1971 | Schuler . |
| 3,767,275 | 10/1973 | Russ, Sr. . |
| 3,782,787 | 1/1974 | Rubel et al. . |
| 3,785,420 | 1/1974 | Bradley et al. . |
| 3,838,894 | 10/1974 | Reedy . |
| 3,865,441 | 2/1975 | Jolliffe . |
| 3,930,689 | 1/1976 | Maki . |
| 3,973,808 | 8/1976 | Janssen et al. . |
| 4,059,315 | 11/1977 | Jolliffe et al. . |
| 4,095,849 | 6/1978 | Husted . |
| 4,218,101 | 8/1980 | Thompson . |
| 4,322,193 | 3/1982 | Stahl . |
| 4,332,424 | 6/1982 | Thompson . |
| 4,530,620 | 7/1985 | McCartney . |
| 4,758,055 | 7/1988 | Anderson . |
| 4,858,697 | 8/1989 | Sherblom . |
| 5,033,801 | 7/1991 | Beeley . |
| 5,188,441 | 2/1993 | Rubel . |
| 5,234,266 | 8/1993 | Musselman et al. . |
| 5,273,351 | 12/1993 | Rubel . |
| 5,284,386 | 2/1994 | Rubel . |
| 5,401,088 | 3/1995 | Rubel . |
| 5,573,316 | 11/1996 | Wankowski . |
| 5,641,214 | 6/1997 | Kafka .................................. 305/192 X |

FOREIGN PATENT DOCUMENTS

| | | |
|---|---|---|
| 844202 | 7/1939 | France ..................................... 301/43 |
| 1156224 | 12/1957 | France . |
| 551811 | 5/1932 | Germany . |
| 2423147 | 10/1974 | Germany . |
| 143943 | 5/1979 | Germany . |
| 213124 | 5/1979 | Germany . |
| 464814 | 8/1997 | Germany . |
| 2214878 | 9/1989 | United Kingdom ..................... 301/43 |

OTHER PUBLICATIONS

Saber Traction Products, Lannon, WI, 1996 Catalog.
Saber Traction Products, Lannon, WI, 1995 Catalog.
Woody's Traction and Control Products, Hope MI, 1995 Winter Catalog.

(List continued on next page.)

[57] ABSTRACT

A ground penetrating traction stud for attaching to a flexible track, the stud having a longitudinal axis, a penetrating member formed with a contact face, a reinforcing rib and a pair of transition facets extending between the edges of the contact face and the reinforcing rib. The contact face may be inclined at an angle between about 3° and 10° to the longitudinal axis.

25 Claims, 1 Drawing Sheet

OTHER PUBLICATIONS

Saber Traction Products, Lannon, WI, 1993 Catalog.
Stafast Products, Painesville, Ohio, Discovered 1995.
McMaster–Carr, p. 2352, Discovered 1995.
Roetin Industries Catalog/Traction Control Systems for the 90's, Victor, New York, Discovered 1995.
Roetin Industries 1987–1988 Applications Chart, Victor, New York.
Roetin industries 1987–1988 Catalogue, Holcomb, New York, Printed in Canada.
Roetin Industries 1969–1989, Aplication Chart, Setting the Standard for Traction Control 1968–1993 Roetin 25 Years.
Roetin industries Traction Control System 1994 Catalog, Victor, New York.
W.Fast–Trac Industries, Lake Zurich, IL 1974, Discovered 1995.
Roetin Product Catalog 1995, If it's not a Roetin, it's a runner–up, Victor, New York.
Roetin Not for Wimps G2 Headers Jun. 1994.
Roetin Dealer News, Victor, New York, Discovered 1995.
Roetin, Attention Hill Climbers, Victor, New York Aug. 1991.
Roetin Studs, Tech Bulletin, Discovered 1995.
Roetin Industries, Hook Up with Roetin, Roetin Racing, Victor, New York, Discovered 1995.
Roetin Industries, Obround Technology, Get Better Bit with Roetin Headers, Discovered 1995.

*Primary Examiner*—Russell D. Stormer
*Attorney, Agent, or Firm*—Cumpston & Shaw

GROUND PENETRATING TRACTION STUD

FIELD OF THE INVENTION

The present invention relates to ground penetrating traction devices, and more particularly to a ground penetrating traction stud for attaching to a flexible track in which the stud has a penetrating member formed with a substantially planar contact face, a reinforcing rib and a pair of transition facets extending between edges of the contact face and the reinforcing rib.

BACKGROUND OF THE INVENTION

Snowmobiles driven over adverse riding surfaces, such as snow and ice employ traction devices which penetrate the riding surface to improve operating performances. The traction devices include an elongated, substantially cylindrical, rigid stud having either a conical or a wedge-shaped penetrating bit, and a semi-cylindrical penetrating bit having a flat side and a chisel-shaped or cone-shaped tip. The tip of the cone or wedge-shaped bit or the chisel-shaped tip penetrates the riding surface to dispose a length of the stud in the riding surface. The bit is either affixed to the stud or integrally formed with the stud.

Traction studs are usually formed with the long axis perpendicular to the head or T-nut so that the stud is at right angles to the direction of rotation of the track. A washer and a T-nut are commonly used to affix the stud to a track. Some embodiments of the device are constructed in a "push-through" configuration in which a head is integrally formed with the inner end of the stud on the inner side of the track and a threaded nut and a washer mounted on the outer end of the stud on the outside of the track. The T-nut or head and the washer provide a large contact area with the track. The large contact area minimizes damage to the track as forces are exerted on the traction device.

Studs with a conical shaped bit provide ready, deep penetration of a riding surface. However, the cone shape allows riding surface matter to slide around the cone, resulting in a loss of traction for forward travel of the sled and instability in a lateral direction. The deep penetration of the bit and the small tip also causes accelerated wear of the bit. While providing a more durable bit wedge shaped bits do not penetrate as deeply as conical bits and there is a loss of traction due to the shallow penetration.

Studs with a semi-cylindrical bit having a flat side facing the rear of the sled as the track meets the riding surface and a chisel-shaped tip allow deep penetration and improved traction in the forward direction over the conical and wedge shaped bits. However, the opposite side of the bit presents a semi-circular face to the riding surface and allows snow or dirt to slide around the bit with loss of lateral stability, especially from side-slipping while negotiating corners. Alternatively, as shown in U.S. Pat. No. 5,573,316, milled faces are formed to define a converging angle as they tend toward a conical tip of the stud.

A snowmobile track may have several hundred studs installed on it. Generally, the greater number of studs on the track the better the traction. However, the greater the number of studs added to the track, the more weight that is added to the vehicle. Obviously a heavier vehicle cannot go as fast or handle corners as well as a lighter one. Furthermore, at speed, the added rotating mass tends to configure the track into a circular shape which unfavorably loads the bearings thereby increasing wear and horse power requirements. U.S. Pat. No. 5,573,316 describes a stud made, at least in part, from aluminum rather than steel to reduce the overall weight. However, aluminum is less durable and is subject to rapid wear.

Therefore, the need exists for a traction stud having good penetrating characteristics while providing durable use. The need further exists for a traction stud having increased lateral stability. The need also exists for a traction stud with a reduced weight, thereby allowing greater transfer of available power to motive forces, as well as reducing wear on the track assembly.

SUMMARY OF THE INVENTION

The present invention includes a traction stud with a longitudinal axis having a ground penetrating member with a contact face and a back, a rib extending from the back along the longitudinal axis and terminating at a terminal edge, and a transition facet extending from the back to the rib. The present stud reduces weight while increasing traction and lateral stability.

Preferably, the ground penetrating member is oriented at an angle of between about 3° and 10° from the longitudinal axis so that the contact face enters the riding surface substantially perpendicular to the surface to reduce penetration resistance and wear of the stud, and increase acceleration.

In another aspect of the invention, a snowmobile traction stud for contacting a flexible track has an elongate ground penetrating member having a longitudinal axis, a substantially planar contact face and a back, the contact face having a distal end remote from the track and a proximal end intermediate the distal end and the track, the contact face oriented at an angle of between about 3° and 10° from the longitudinal axis so that the distal end is further from the longitudinal axis than the proximal end; a reinforcing rib extending from the back along the longitudinal axis and terminating at a terminal edge; and a transition facet extending from a longitudinal edge of the back to each side of the rib.

Preferably the transition facet is concave and the terminal edge intersects the contact face at an angle between about 10° and 45°.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

DETAILED DESCRIPTION OF A PREFERRED EMBODIMENT

Figure 1:
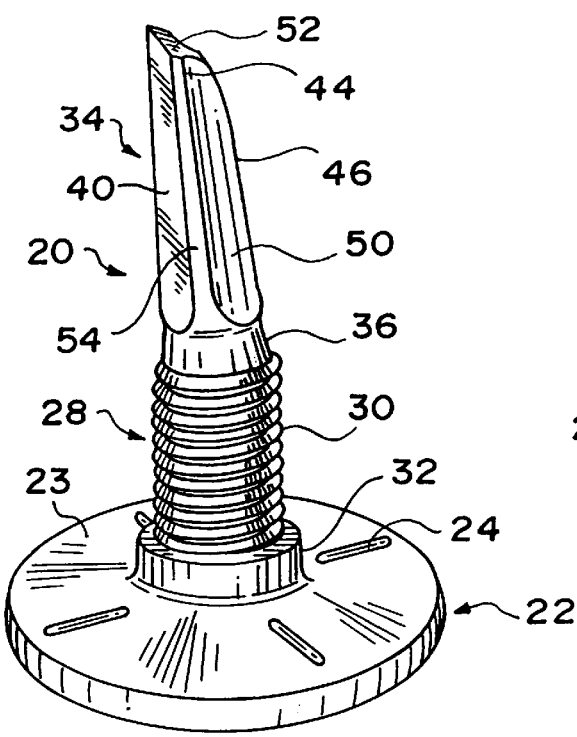
FIG. 1 is a perspective view of a traction stud.
Figure 2:
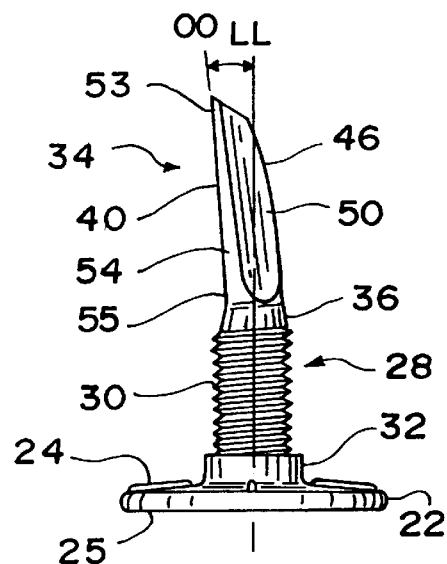
FIG. 2 is a side elevation view of the traction stud.
Figure 3:
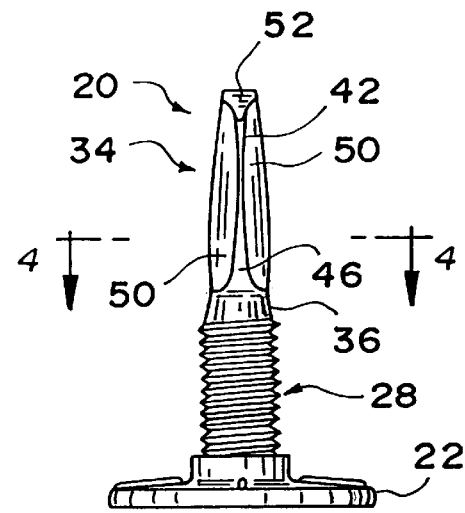
FIG. 3 is a rear elevation view of the traction stud.

Referring to FIGS. 1–3 a push-through type snowmobile traction stud 20 is disclosed. The stud 20 has a head 22 at one end of the stud. The bead 22 has a track contacting side 23 and a free side 25. The track contacting side 23 has a plurality of protruding ridges 24 for gripping a snowmobile track 70 and preventing rotation of the stud 20 relative to the track. The head 22 has a relatively large surface area in contact with the track 70 to minimize damage of the track and to provide support for stud rigidity. The head 22 can be of any suitable shape, preferably circular or oval shaped. The stud 20 includes a barrel 28 extending perpendicularly from the head 22. The barrel 28 includes a threaded section 30 for securing a nut to the stud 20 thereby securing stud 20 to the track 70. The terminal portion of the barrel 28 includes a ground penetrating member 34. The ground penetrating member 34 is shown integrally connected to the threaded section 30 by a conical transition 36.

The stud 20 is formed of hardened steel, preferably molybdenum steel and can be forged and/or machined to the desired configuration. Preferably the head 22, the barrel 28, the transition 36 and the ground penetrating member 34 are integrally formed.

The penetrating member 34 includes a contact face 40 which is substantially planar and a rib 42 extending from a back 44 of the contact face 40 along the length of the member 34. Though the contact face 40 is defined as substantially planar, it is understood that the contact face may include surface features such as knurled, pebbled or grained. The rib 42 terminates in a terminal edge 46. The contact face is partially defined by edges 54 and tip 52. A pair of transition facets 50, preferably non-convex shaped, preferably concave-shaped, extend from the edges 54 to the rib 42 and preferably extend to the terminal edge 46.

The transition facet is defined by a cross sectional area that is less than the cross sectional area defined by a radius of a corresponding circumscribing cylindrical section. That is, the transition face may define a variety of segments, which may be concave, convex, curvilinear, straight or of varying radii. However, any combination of these segments defining the transition facet represents a smaller cross sectional area than a radius of a circle sufficient to circumscribe the terminal edge and the contact face.

As shown the transition facet is preferably concave between the edges 54 and the terminal edge 46.

The terminal edge 46 intersects the contact face 40 at the tip 52 to form chisel-shaped tip 52. The contact face 40 tapers slightly from the conical transition 36 to the tip 52. The terminal edge 46 can be parallel to the longitudinal axis L, the contact face or independent of the longitudinal axis. In a preferred embodiment, the terminal edge 46 extends generally parallel to the contact face 40. This configuration of the stud 20 presents the terminal edge 46 of the rib 42 and the transition facets 50 to the riding surface. The transition facets 50 resistantly engage the penetrated surface matter to reduce side-slipping and provide increased stability on cornering.

Figure 4:
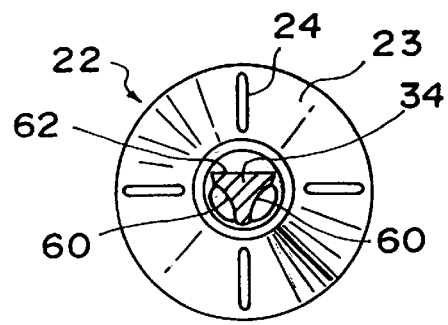
FIG. 4 is a cross sectional view of the traction stud of FIG. 3 taken along lines 4—4.

As shown in FIG. 4, the cross sectional area of the present stud is substantially less than an encompassing cylindrical stud. The transition facets 50 reduce the weight and the penetrating resistance because of the smaller cross sectional area, whereas the reinforcing rib 42 increases rigidity and strength of the stud 20.

Referring to FIG. 2, the barrel 28 has a longitudinal axis L—L perpendicular to the head 22. In a preferred embodiment of the traction stud 20, the contact face 40 is inclined to the longitudinal axis along the axis O—O at an angle between about 3° and 10°, and preferably about 5°, so that the distal end 53 of the contact face 40 is further from the longitudinal axis than the proximal end 55 of the contact face 40.

The angle of intersection of the contact face 40 and the terminal edge 46 is between about 10° and 45°, preferably about 30°, to provide a tip which is sharp enough to penetrate a riding surface, but strong enough to prevent breaking and rapid wear.

The intersection of the contact face 40 with each transition facet 50 is defined by the edge 54 which extends between the tip 52 and the conical transition section 36. Each edge 54 intersects the contact face 40. The surface of the conical section 36 is angled between about 15° to 30° to the longitudinal axis LL.

Referring to FIG. 4, the penetrating member 34 has a generally triangular-shaped cross section having two concave-shaped sides 60 corresponding to the facets 50 and a straight side 62 corresponding to the contact face 40. In a preferred embodiment, the straight side 62 is longer than the chord length between the terminal edge 46 and either edge 54.

Known push-through traction studs having a semi-cylindrical penetrating member with the flat side of the cylinder being the contact surface provide good penetration of a riding surface such as ice, snow, slush, dirt and grass. Forward traction is enhanced because the flat face presents a larger thrust-transferring surface to the riding surface matter than, for example, a cone-shaped penetrating member. However, like the cone-shaped member the convex surface of the semi-cylindrical member causes the surface matter to slide or flow around the member with little resistance. This lack of resistance, especially in a lateral direction, results in a loss of traction during cornering and consequently side-slipping of a snowmobile occurs. In such tracks lateral stability can be improved by orienting a number of the studs with the flat surface of the stud at an angle to the direction of travel. Such traction studs, in which the flat contact surface is parallel to the longitudinal axis or angled so that the distal end of the contact surface remote from the track is closer to the longitudinal axis than the proximal end of the contact surface, enter the riding surface at an angle which increases penetration resistance and wear of the stud, and reduces acceleration.

As described above with reference to FIG. 2, the traction stud 20 of the invention has a longitudinal axis L—L perpendicular to the head 22. In a preferred embodiment of the traction stud 20 the contact face 40 is inclined to the longitudinal axis L—L along the axis O—O at an angle between about 3° and 10°, preferably about 5°. Therefore, when a penetrating member 34 with an angled contact face 40 comes off the idler wheel to penetrate the riding surface, the contact face is inclined more toward a perpendicular orientation to the riding surface. At such an angle of penetration the contact face 40 is subject to reduced forces perpendicular to the longitudinal axis. Such reduced resistance increases penetration of the stud as well as forward thrust and aggressive acceleration of the snowmobile.

The length of a snowmobile traction stud is determined by the operating conditions, the height of the track ridges and applicable rules. In a preferred embodiment of the traction stud of the invention, the head 22 is circular or around with a major diameter of about 20 to 30 mm. The overall length of the stud 20 is about 30 mm to 50 mm, and preferably about 40 mm. The penetrating member 34 is about 15 mm to 25 mm long. In a preferred embodiment the contact face 40 has a maximum width of about 5 mm to 8 mm and a minimum width of about 2.5 mm to 5 mm at the tip 52.

Figure 5:
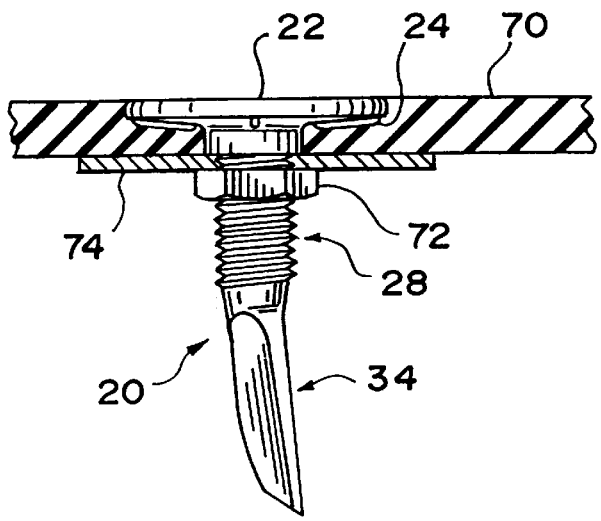
FIG. 5 is a side elevation view of a traction stud mounted to a flexible track shown in partial cross section.

Referring to FIG. 5, the traction stud is shown mounted to the resilient snowmobile track 70. This can be accomplished in a variety of ways well known to those skilled in the art. In a preferred method, the barrel 28 is pushed through an opening in the track from the non-ground contacting side of the track, so that the penetrating member 34 and the barrel 28 extend beyond the ground contacting side of the track. Head 22 is seated into the non-ground contacting surface of the track. A nut 72 and a washer 74 are screwed down to sandwich the track 70 between the head 22 and the washer. The nut 72 is tightened so that the head 22 and the ridges 24 are drawn into the resilient track 70, and thus rotation of the stud 20 is minimized.

The traction stud of the invention having a penetrating member 34 with an essentially flat contact face 40, a reinforcing rib 42 and concave transition facets 50 has a smaller cross-section than a stud with a semi-cylindrical penetrating member. This results in a stud with as much as a 50% smaller cross section and significantly reduced weight while maintaining strength and rigidity. The reduced cross-sectional area decreases penetrating resistance while the concave sides provide increased resistance to side-slipping. The traction stud of the invention enables snowmobiles to accelerate more aggressively and minimizes side slipping in corners.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. A traction stud having a longitudinal axis, comprising:
   (a) a ground penetrating member having a substantially planar contact face and a back, the contact face being oriented at an angle between about 3° and 10° from the longitudinal axis;
   (b) a rib having sides substantially parallel to the longitudinal axis and a terminal edge between the sides, the rib extending from the back along the longitudinal axis and terminating at the terminal edge; and
   (c) a transition facet extending from the back to each side of the rib.

2. The traction stud of claim 1, wherein the rib is perpendicular to the contact face.

3. The traction stud of claim 1, wherein the transition facet is concave.

4. The traction stud of claim 1, wherein the transition facet extends to the terminal edge.

5. The traction stud of claim 1, further comprising first and second edge surfaces between the contact face and the back.

6. The traction stud of claim 5, wherein the terminal edge extends generally parallel to the contact face.

7. The traction stud of claim 1, wherein the terminal edge extends generally parallel to the longitudinal axis.

8. The traction stud of claim 1, wherein the terminal edge extends generally parallel to the contact face.

9. The traction stud of claim 1, further comprising a threaded section and a conical transition connecting the contact face to the threaded section.

10. The traction stud of claim 9, further comprising a generally flat head attached to the threaded section.

11. A snowmobile traction stud for contacting a flexible track, comprising:
    (a) an elongate ground penetrating member having a longitudinal axis, a substantially planar contact face and a back, the contact face having a distal end remote from the track and a proximal end intermediate the distal end and the track, the contact face oriented at an angle of between about 3° and 10° from the longitudinal axis so that the distal end is further from the longitudinal axis than the proximal end;
    (b) a reinforcing rib having sides substantially parallel to the longitudinal axis and a terminal edge between the sides, the rib extending from the back along the longitudinal axis and terminating at the terminal edge; and
    (c) a transition facet extending from a longitudinal edge of the back to each side of the rib.

12. The traction stud of claim 11, wherein the rib is perpendicular to the contact face.

13. The traction stud of claim 11, wherein the transition facet is concave.

14. The traction stud of claim 11, further comprising first and second longitudinal edge surfaces between the contact face and the back.

15. The traction stud of claim 11, wherein the terminal edge extends generally parallel to the contact face.

16. The traction stud of claim 11, wherein the transition facet extends to the terminal edge.

17. The traction stud of claim 11, further comprising a penetrating end defined by the intersection of the terminal edge, the contact face and each transition facet.

18. A snowmobile traction stud for contacting a flexible track, comprising:
    (a) an elongate ground penetrating member having a longitudinal axis, a substantially planar contact face and a back, the contact face having a distal end remote from the track and a proximal end intermediate the distal end and the track, the contact face oriented at an angle of between about 3° and 10° from the longitudinal axis so that the distal end is further from the longitudinal axis than the proximal end; and
    (b) a thrust transfer surface for transmitting forward traction force to a riding surface, wherein the transfer surface is substantially defined by the contact face.

19. The traction stud of claim 18, further comprising a reinforcing rib extending from the back along the longitudinal axis and terminating at a terminal edge.

20. The traction stud of claim 19, further comprising a transition facet extending from a longitudinal edge of the back to each side of the rib.

21. The traction stud of claim 20, wherein the transition facet is concave.

22. The traction stud of claim 20, wherein the rib is perpendicular to the contact face.

23. A method of forming a laterally stable traction stud comprising:
    (a) forming a substantially planar contact face inclined with respect to a longitudinal axis to dispose a distal portion of the contact face a greater distance from the longitudinal axis than a proximal portion of the contact face;
    (b) forming a rib on a back of the contact face to extend along the longitudinal axis; and
    (c) forming a transition facet between an edge of the contact face and the rib.

24. The method of claim 23, wherein forming the contact face includes one of forging, machining and milling.

25. The method of claim 23, wherein forming the transition facet includes forming a concave surface.

* * * * *